US012735610B2

(12) United States Patent
Koganehira

(10) Patent No.: US 12,735,610 B2
(45) Date of Patent: Sep. 15, 2026

(54) LIQUID EJECTING HEAD AND LIQUID EJECTING APPARATUS

(71) Applicant: SEIKO EPSON CORPORATION, Tokyo (JP)

(72) Inventor: Shuichi Koganehira, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 149 days.

(21) Appl. No.: 18/748,610

(22) Filed: Jun. 20, 2024

(65) Prior Publication Data

US 2024/0425726 A1 Dec. 26, 2024

(30) Foreign Application Priority Data

Jun. 21, 2023 (JP) ................................ 2023-101508

(51) Int. Cl.

*B41J 2/14* (2006.01)
*B41J 2/175* (2006.01)
*C09J 11/06* (2006.01)
*C09J 163/00* (2006.01)

(52) U.S. Cl.

CPC .......... *C09J 11/06* (2013.01); *B41J 2/14233* (2013.01); *B41J 2/17563* (2013.01); *C09J 163/00* (2013.01); *B41J 2002/14306* (2013.01); *B41J 2002/14362* (2013.01); *B41J 2002/14403* (2013.01)

(58) Field of Classification Search

None

See application file for complete search history.

(56) References Cited

U.S. PATENT DOCUMENTS 4,609,427 A * 9/1986 Inamoto ................ B41J 2/1433 216/33
2006/0207720 A1 9/2006 Yoshizawa et al.
2018/0299774 A1* 10/2018 Hirano .................... G03F 7/022
2021/0316047 A1* 10/2021 Dao .......................... C08L 5/08
2025/0051616 A1* 2/2025 Tsumura .................... C09J 5/00

FOREIGN PATENT DOCUMENTS

JP 2006-291167 A 10/2006
JP 2015-054446 A 3/2015
JP 2017171984 A * 9/2017

OTHER PUBLICATIONS

Uesugi, MachineTranslationofJP-2017171984-A, 2017 (Year: 2017).*

* cited by examiner

*Primary Examiner* — Scott A Richmond
(74) *Attorney, Agent, or Firm* — Harness, Dickey & Pierce, P.L.C.

(57) ABSTRACT

A liquid ejecting head includes a nozzle configured to eject a liquid, a first flow path member that defines a portion of a flow path for supplying the liquid to the nozzle, a second flow path member that is bonded to the first flow path member to define a portion of the flow path and that is formed of a metal, and an adhesive that bonds the first flow path member and the second flow path member. The adhesive contains a water-insoluble chelate compound.

13 Claims, 10 Drawing Sheets

| | | CHELATE COMPOUND MIXTURE | | | | CHELATE COMPOUND | |
|---|---|---|---|---|---|---|---|
| | | 1 | 2 | 3 | 4 | 5 | 6 |
| COMPOSITION | 5-CARBOXYBENZOTRIAZOLE | 10 | 10 | 10 | 10 | 0 | 0 |
| | 1-[N,N-BIS (2-ETHYLHEXYL) AMINOMETHYL] BENZOTRIAZOLE | 0 | 0 | 0 | 0 | 10 | 0 |
| | 1-[N,N-BIS (2-ETHYLHEXYL) AMINOMETHYL] METHYLBENZOTRIAZOLE | 0 | 0 | 0 | 0 | 0 | 10 |
| | DIETHYLENE GLYCOL DIETHYL ETHER | 15 | 30 | 0 | 0 | 0 | 0 |
| | DIETHYLENE GLYCOL DIBUTYL ETHER | 0 | 0 | 15 | 30 | 0 | 0 |
| TEST | AGGREGATE MASS | B | A | A | A | – | – |
| | SUPERNATANT AFTER 28 DAYS | B | B | A | A | – | – |

| | | CHELATE COMPOUND MIXTURE | | | | CHELATE COMPOUND | |
|---|---|---|---|---|---|---|---|
| | | 1 | 2 | 3 | 4 | 5 | 6 |
| COMPOSITION | 5-CARBOXYBENZOTRIAZOLE | 10 | 10 | 10 | 10 | 0 | 0 |
| | 1-[N,N-BIS (2-ETHYLHEXYL) AMINOMETHYL] BENZOTRIAZOLE | 0 | 0 | 0 | 0 | 10 | 0 |
| | 1-[N,N-BIS (2-ETHYLHEXYL) AMINOMETHYL] METHYLBENZOTRIAZOLE | 0 | 0 | 0 | 0 | 0 | 10 |
| | DIETHYLENE GLYCOL DIETHYL ETHER | 15 | 30 | 0 | 0 | 0 | 0 |
| | DIETHYLENE GLYCOL DIBUTYL ETHER | 0 | 0 | 15 | 30 | 0 | 0 |
| TEST | AGGREGATE MASS | B | A | A | A | – | – |
| | SUPERNATANT AFTER 28 DAYS | B | B | A | A | – | – |

FIG. 6

| | ADHESIVE SAMPLE | 1 | 2 | 3 | 4 | 5 | 6 | 7 | 8 | 9 | 10 |
|---|---|---|---|---|---|---|---|---|---|---|---|
| COMPOSITION | P | 10 | 10 | 20 | 20 | 10 | 10 | 20 | 20 | 10 | 10 |
| | Q | 50 | 60 | 50 | 60 | 50 | 60 | 50 | 60 | 50 | 50 |
| | S | 6 | 7 | 7 | 8 | 6 | 7 | 7 | 8 | 6 | 6 |
| | CHELATE COMPOUND MIXTURE 1 | 2 | 2 | 2 | 2 | 6 | 6 | 6 | 6 | 0.5 | 10 |
| | MASS OF CHELATE COMPOUND CONTAINED IN ADHESIVE AFTER CURING | 0.8 | 0.8 | 0.8 | 0.8 | 2.4 | 2.4 | 2.4 | 2.4 | 0.2 | 4 |
| | CHELATE COMPOUND/ ADHESIVE AFTER CURING % BY MASS (ROUNDED TO SECOND DECIMAL PLACE) | 1.20 | 1.03 | 1.03 | 0.90 | 3.51 | 3.02 | 3.02 | 2.65 | 0.3 | 5.71 |
| TEST | SHAPE OF TRANSFER FILM | B | B | B | B | B | B | B | B | B | B |
| | BONDING STRENGTH | B | B | B | B | B | B | B | B | C | C |

FIG. 7

| | ADHESIVE SAMPLE | 11 | 12 | 13 | 14 | 15 | 16 | 17 | 18 | 19 | 20 |
|---|---|---|---|---|---|---|---|---|---|---|---|
| COMPOSITION | P | 10 | 10 | 20 | 20 | 10 | 10 | 20 | 20 | 20 | 20 |
| | Q | 50 | 60 | 50 | 60 | 50 | 60 | 50 | 60 | 60 | 60 |
| | S | 6 | 7 | 7 | 8 | 6 | 7 | 7 | 8 | 8 | 8 |
| | CHELATE COMPOUND MIXTURE 2 | 2 | 2 | 2 | 2 | 6 | 6 | 6 | 6 | 0.5 | 10 |
| | MASS OF CHELATE COMPOUND CONTAINED IN ADHESIVE AFTER CURING | 0.5 | 0.5 | 0.5 | 0.5 | 1.5 | 1.5 | 1.5 | 1.5 | 0.2 | 4 |
| | CHELATE COMPOUND/ ADHESIVE AFTER CURING % BY MASS (ROUNDED TO SECOND DECIMAL PLACE) | 0.75 | 0.65 | 0.65 | 0.56 | 2.22 | 1.91 | 1.91 | 1.68 | 0.23 | 4.35 |
| TEST | SHAPE OF TRANSFER FILM | A | A | A | A | A | A | A | A | A | A |
| | BONDING STRENGTH | A | A | A | A | A | A | A | A | C | C |

FIG. 8

| | | 21 | 22 | 23 | 24 | 25 | 26 | 27 | 28 | 29 | 30 |
|---|---|---|---|---|---|---|---|---|---|---|---|
| | ADHESIVE SAMPLE | 21 | 22 | 23 | 24 | 25 | 26 | 27 | 28 | 29 | 30 |
| COMPOSITION | P | 10 | 10 | 20 | 20 | 10 | 10 | 20 | 20 | 10 | 10 |
| | Q | 50 | 60 | 50 | 60 | 50 | 60 | 50 | 60 | 60 | 60 |
| | S | 6 | 7 | 7 | 8 | 6 | 7 | 7 | 8 | 7 | 7 |
| | CHELATE COMPOUND MIXTURE 3 | 2 | 2 | 2 | 2 | 6 | 6 | 6 | 6 | 0.5 | 10 |
| | MASS OF CHELATE COMPOUND CONTAINED IN ADHESIVE AFTER CURING | 0.8 | 0.8 | 0.8 | 0.8 | 2.4 | 2.4 | 2.4 | 2.4 | 0.2 | 4 |
| | CHELATE COMPOUND/ ADHESIVE AFTER CURING % BY MASS (ROUNDED TO SECOND DECIMAL PLACE) | 1.20 | 1.03 | 1.03 | 0.9 | 3.51 | 3.02 | 3.02 | 2.65 | 0.26 | 4.94 |
| TEST | SHAPE OF TRANSFER FILM | A | A | A | A | A | A | A | A | A | A |
| | BONDING STRENGTH | A | A | A | A | A | A | A | A | C | C |

FIG. 9

| | ADHESIVE SAMPLE | 31 | 32 | 33 | 34 | 35 | 36 | 37 | 38 | 39 | 40 |
|---|---|---|---|---|---|---|---|---|---|---|---|
| COMPOSITION | P | 10 | 10 | 20 | 20 | 10 | 10 | 20 | 20 | 20 | 20 |
| | Q | 50 | 60 | 50 | 60 | 50 | 60 | 50 | 60 | 50 | 50 |
| | S | 6 | 7 | 7 | 8 | 6 | 7 | 7 | 8 | 7 | 7 |
| | CHELATE COMPOUND MIXTURE 4 | 2 | 2 | 2 | 2 | 6 | 6 | 6 | 6 | 0.5 | 10 |
| | MASS OF CHELATE COMPOUND CONTAINED IN ADHESIVE AFTER CURING | 0.5 | 0.5 | 0.5 | 0.5 | 1.5 | 1.5 | 1.5 | 1.5 | 0.2 | 4 |
| | CHELATE COMPOUND/ ADHESIVE AFTER CURING % BY MASS (ROUNDED TO SECOND DECIMAL PLACE) | 0.75 | 0.65 | 0.65 | 0.56 | 2.22 | 1.91 | 1.91 | 1.68 | 0.26 | 4.94 |
| TEST | SHAPE OF TRANSFER FILM | A | A | A | A | A | A | A | A | A | A |
| | BONDING STRENGTH | A | A | A | A | A | A | A | A | C | C |

FIG. 10

| ADHESIVE SAMPLE | | 41 | 42 | 43 | 44 |
|---|---|---|---|---|---|
| COMPOSITION | P | 10 | 10 | 10 | 10 |
| | Q | 50 | 50 | 50 | 50 |
| | S | 6 | 6 | 6 | 6 |
| | CHELATE COMPOUND 5 | 0. 5 | 1. 5 | 0 | 0 |
| | CHELATE COMPOUND 6 | 0 | 0 | 0. 5 | 1. 5 |
| | CHELATE COMPOUND/ ADHESIVE AFTER CURING % BY MASS (ROUNDED TO SECOND DECIMAL PLACE) | 0. 83 | 2. 44 | 0. 83 | 2. 44 |
| TEST | SHAPE OF TRANSFER FILM | B | B | B | B |
| | BONDING STRENGTH | B | B | B | B |

LIQUID EJECTING HEAD AND LIQUID EJECTING APPARATUS

The present application is based on, and claims priority from JP Application Serial Number 2023-101508, filed Jun. 21, 2023, the disclosure of which is hereby incorporated by reference herein in its entirety.

BACKGROUND

1. Technical Field

The present disclosure relates to a liquid ejecting head that ejects a liquid, and a liquid ejecting apparatus.

2. Related Art

A liquid ejecting apparatus typified by an ink jet recording apparatus such as a printer or a plotter includes a liquid ejecting head such as an ink jet recording head that ejects ink.

For example, JP-A-2015-054446 discloses a liquid ejecting head including a nozzle plate in which nozzles for ejecting liquid are formed, a flow path plate disposed on the nozzle plate, a diaphragm member disposed on the flow path plate, and a frame member disposed on the diaphragm member. In addition, as the diaphragm member, a diaphragm formed of a metal plate of nickel (Ni) and manufactured by an electroforming method is used. The nozzle plate, the flow path plate, and the diaphragm member as a thin film member are stacked together.

However, as in the liquid ejecting head according to JP-A-2015-054446, when a metal flow path member is bonded to a flow path member that forms a flow path in which liquid flows with an adhesive, there arises a problem in that the bonding interface comes into contact with the liquid in the flow path, and metal ions are eluted from the bonding interface into the liquid in the flow path, which may decrease the bonding strength. Such a problem similarly exists in a liquid ejecting head and a liquid ejecting apparatus that eject liquids other than ink.

SUMMARY

According to an aspect of the present disclosure, there is provided a liquid ejecting head including a nozzle that ejects a liquid, a first flow path member that defines a portion of a flow path for supplying the liquid to the nozzle, a second flow path member that is bonded to the first flow path member to define a portion of the flow path and that is formed of a metal, and an adhesive that bonds the first flow path member and the second flow path member. The adhesive contains a water-insoluble chelate compound.

According to another aspect of the present disclosure, there is provided a liquid ejecting apparatus including the liquid ejecting head according to the above aspect.

BRIEF DESCRIPTION OF THE DRAWINGS

FIG. 5 is a table showing the individual components of chelate compound mixtures 1 to 4 and chelate compounds 5 and 6 and test results.

FIG. 6 is a table showing the individual components of adhesive samples 1 to 10 and test results.

FIG. 7 is a table showing the individual components of adhesive samples 11 to 20 and test results.

FIG. 8 is a table showing the individual components of adhesive samples 21 to 30 and test results.

FIG. 9 is a table showing the individual components of adhesive samples 31 to 40 and test results.

FIG. 10 is a table showing the individual components of adhesive samples 41 to 44 and test results.

DESCRIPTION OF EMBODIMENTS

Figure 1:
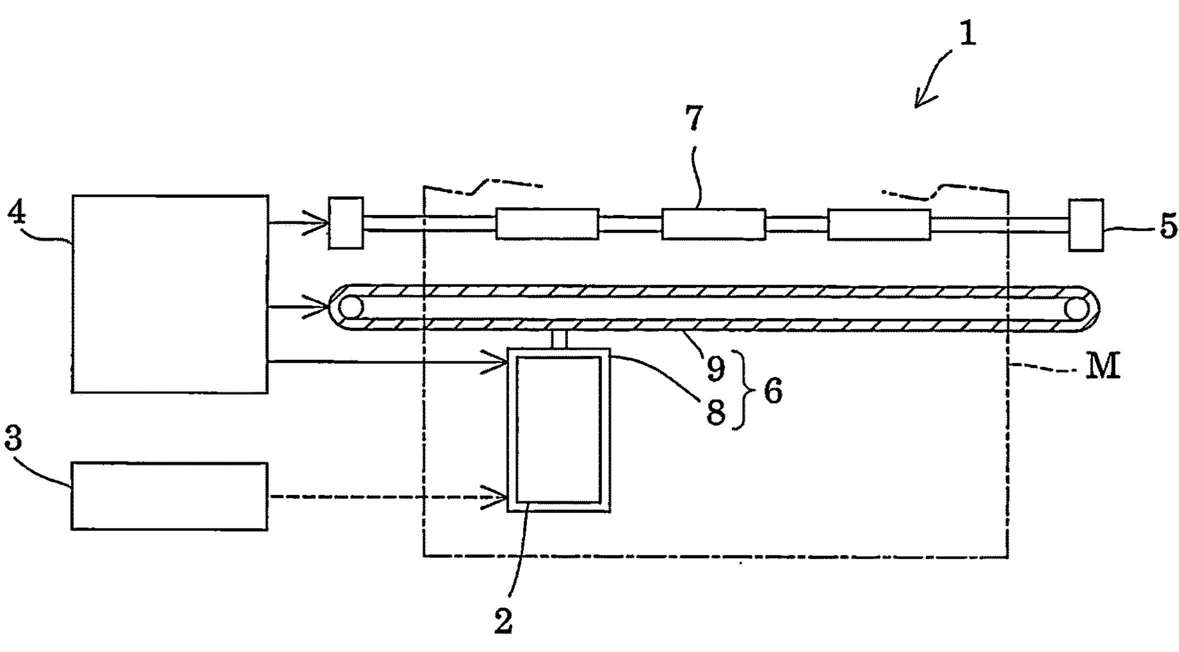
FIG. 1 is a schematic view showing an ink jet recording apparatus according to a first embodiment.
Figure 1:
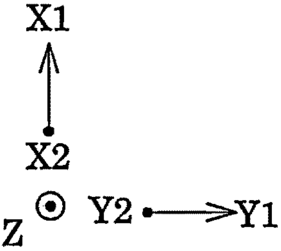

Hereinafter, the present disclosure will be described in detail based on embodiments. However, the following description illustrates one aspect of the present disclosure, and any change can be made within the scope of the present disclosure.

In the drawings, X, Y, and Z denote three spatial axes that are orthogonal to one another. Directions along these three axes are referred to as an X direction, a Y direction, and a Z direction, each of which is not limited to a positive direction or a negative direction. In the drawings, directions indicated by arrows are referred to as an X1 direction, a Y1 direction, and a Z1 direction, and directions opposite to the arrows are referred to as an X2 direction, a Y2 direction, and a Z2 direction. The Y direction (Y1 direction and Y2 direction) corresponds to a transport direction of a medium. The Z2 direction indicates a vertical downward direction, and the Z1 direction indicates a vertical upward direction. Note that the Z direction does not need to be a vertical direction. Further, the X-axis, the Y-axis, and the Z-axis are orthogonal to one another. However, the present disclosure is not limited thereto, and for example, the axes may intersect at an angle within a range of 80 degrees or more and 100 degrees or less.

First Embodiment

An ink jet recording apparatus 1 (hereinafter simply referred to as "recording apparatus") shown in FIG. 1 is an example of a liquid ejecting apparatus and is a printing apparatus that ejects ink, as a type of liquid, toward a medium M such as a print sheet such that ink droplets land on the medium M, thereby printing an image or the like composed of an arrangement of dots formed on the medium M. The liquid may be, for example, an ultraviolet curable ink (hereinafter referred to as UV ink) or a solvent-based ink. Note that as the medium M, in addition to recording paper, any material such as a resin film or a cloth can be used.

The solvent-based ink is an ink in which the main component of the solvent is an organic solvent, and is also called solvent ink or non-aqueous ink. The solvent-based ink is an ink containing any one or more of glycol ethers, glycol ether esters, dibasic acid esters, ester-based solvents, hydrocarbon-based solvents, and alcohol-based solvents. In addition, the UV ink is, for example, an ink containing a monomer or an oligomer that is cured by causing a polymerization reaction by irradiation with ultraviolet rays. Examples of the composition of the UV ink include inks containing any one of (meth)acrylates, (meth)acrylamides, and N-vinyl compounds as a polymerizable compound.

The recording apparatus 1 includes an ink jet recording head 2 (hereinafter also simply referred to as "recording head 2"), a liquid container 3, a control unit 4, a transport mechanism 5 that feeds the medium M, and a moving mechanism 6.

The recording head 2 is an example of a liquid ejecting head and ejects ink supplied from the liquid container 3 onto the medium M from a plurality of nozzles. The detailed configuration of the recording head 2 will be described later.

The liquid container 3 is an example of a liquid storage unit that stores a liquid to be supplied to the recording head 2 and individually stores a plurality of types (for example, a plurality of colors) of inks to be ejected from the recording head 2. Examples of the liquid storage unit include cartridges attachable to and detachable from the recording apparatus 1, bag-shaped ink packs formed of a flexible film, and ink tanks replenishable with ink.

The control unit 4 includes, for example, a control device such as a central processing unit (CPU) or a field-programmable gate array (FPGA), and a storage device such as semiconductor memory. The control device executes programs stored in the storage device, and thereby the control unit 4 performs overall control of the individual elements of the recording apparatus 1, that is, the recording head 2, the transport mechanism 5, the moving mechanism 6, and the like.

The transport mechanism 5 is a mechanism that transports the medium M in the X direction. Specifically, the transport mechanism 5 has transport rollers 7 and transports the medium M in the X direction by rotating the transport rollers 7. The transport mechanism 5 for transporting the medium M is not limited to the mechanism including the transport rollers 7 and may be a mechanism that transports the medium M by using, for example, a belt or a drum.

The moving mechanism 6 is a mechanism for causing the recording head 2 to reciprocate in the Y direction and includes a transport body 8 and a transport belt 9. The transport body 8 is a substantially box-shaped structure for housing the recording head 2, a so-called carriage, and is fixed to the transport belt 9. The transport belt 9 is an endless belt looped in the Y direction. The transport belt 9 rotates under the control of the control unit 4 and thereby the recording head 2 reciprocates together with the transport body 8 in the Y direction. Note that the transport body 8 may have mounted thereon the liquid container 3 together with the recording head 2.

The recording head 2 performs, under the control of the control unit 4, an ejection operation of ejecting the ink supplied from the liquid container 3 as ink droplets in the Z2 direction from the plurality of nozzles onto the medium M. The ejection operation by the recording head 2 is performed in parallel with transport of the medium M by the transport mechanism 5 and reciprocation of the recording head 2 by the moving mechanism 6, so that an image is formed on the surface of the medium M by the ink; in other words, so-called printing is performed.

Figure 2:
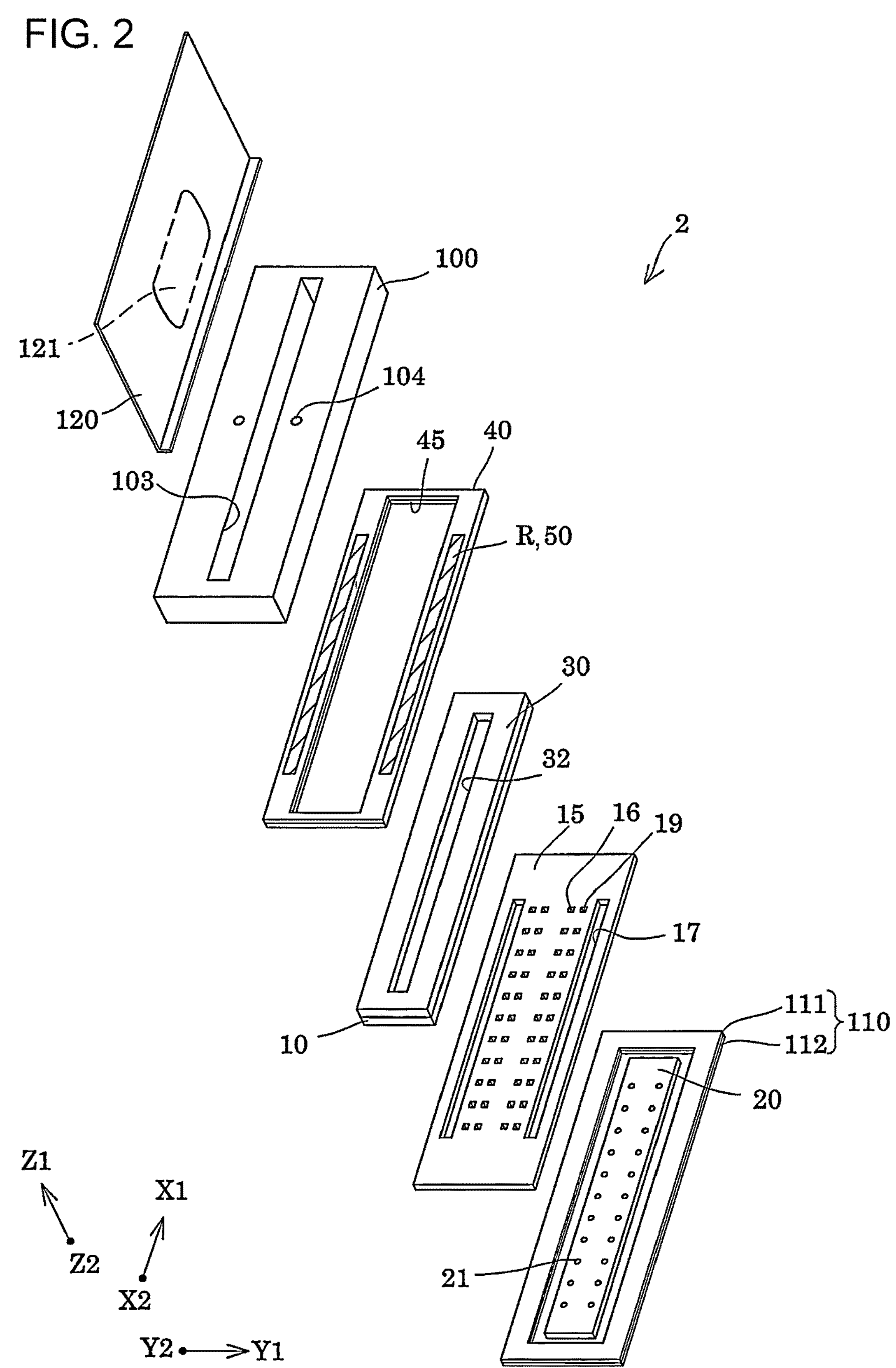
FIG. 2 is an exploded perspective view showing a recording head according to the first embodiment.
Figure 3:
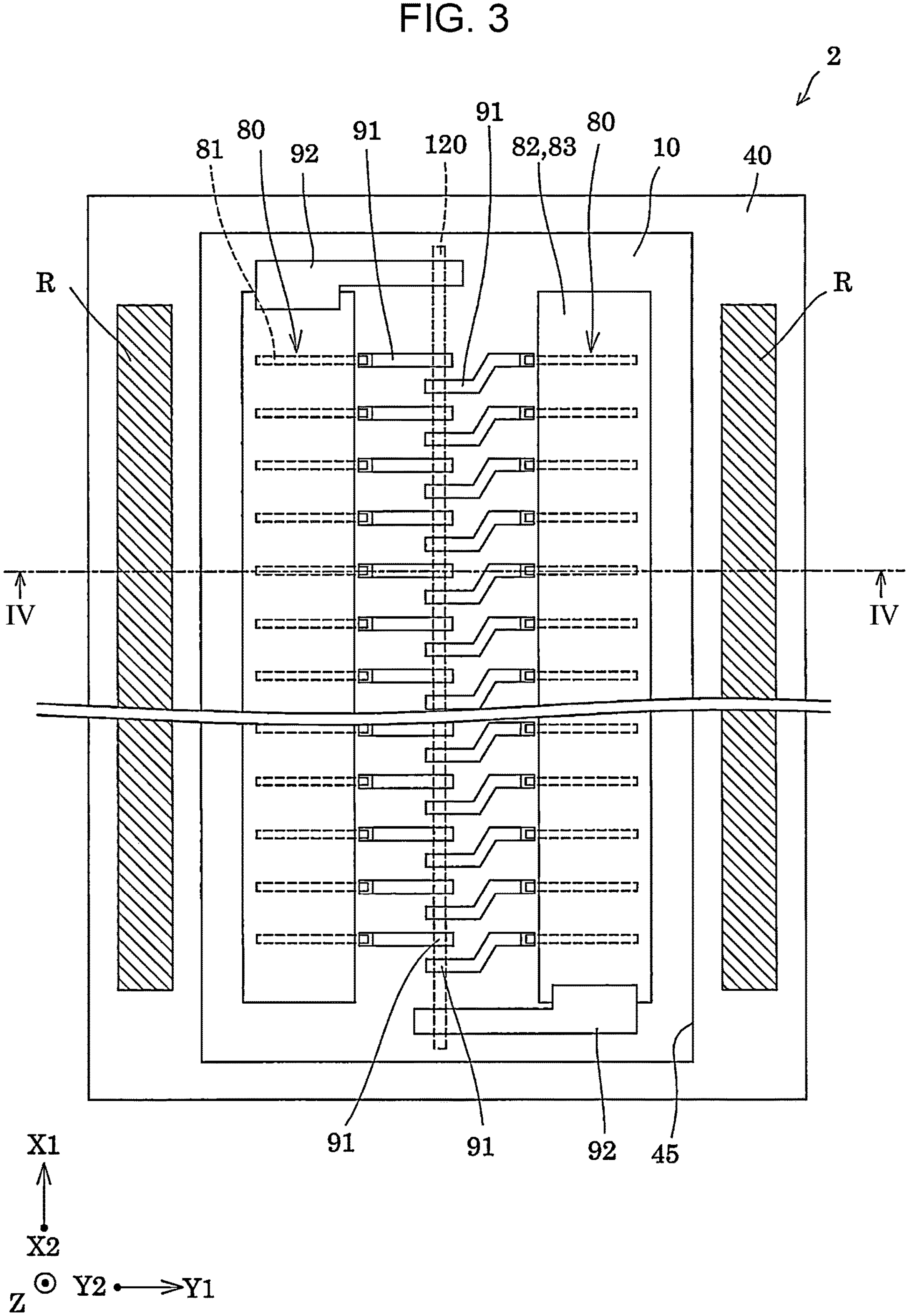
FIG. 3 is a plan view showing the recording head according to the first embodiment.
Figure 4:
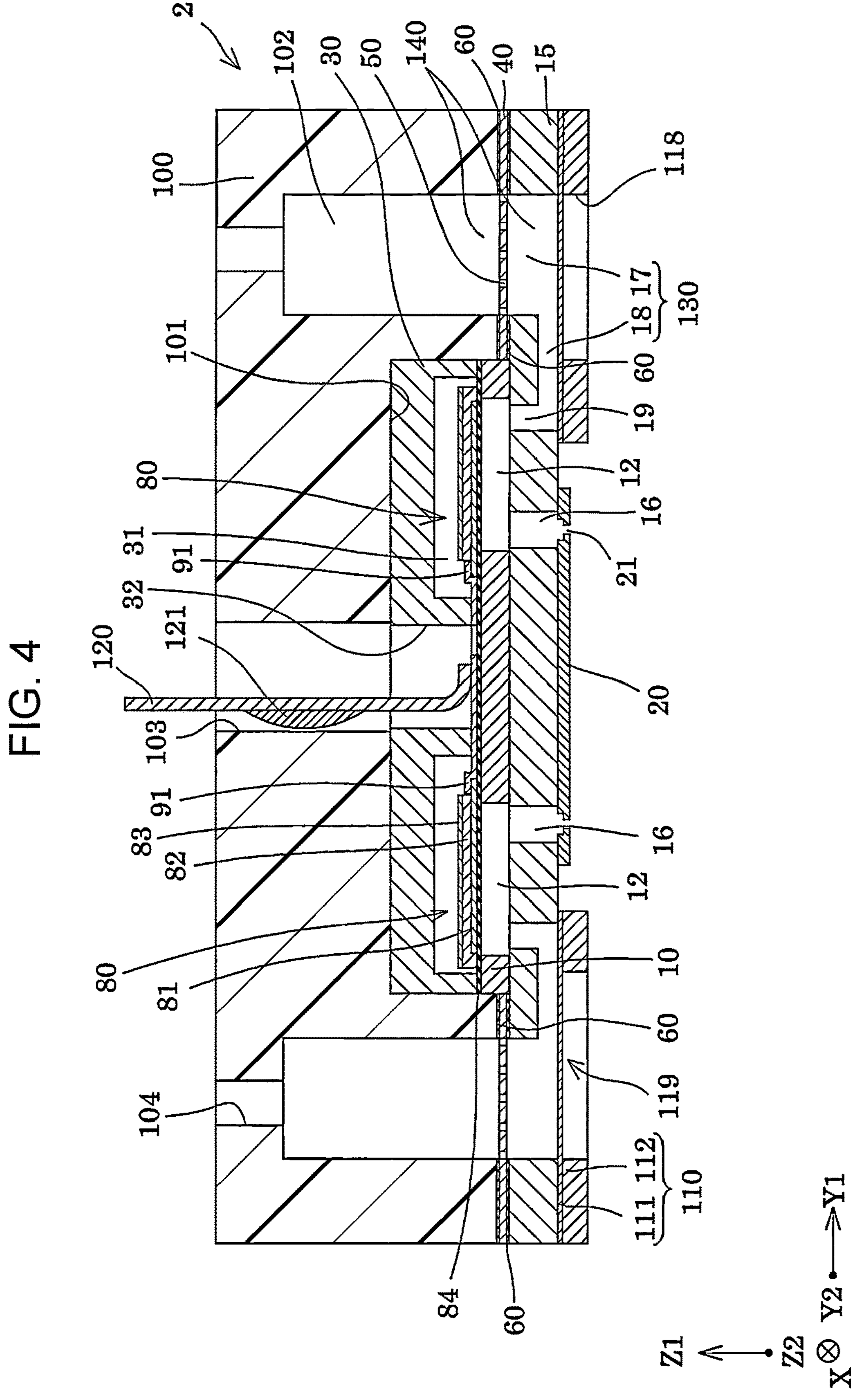
FIG. 4 is a sectional view showing the recording head according to the first embodiment.

The recording head 2 will be described using FIGS. 2 to 4. FIG. 2 is an exploded perspective view showing the recording head 2, FIG. 3 is a plan view showing the recording head 2, and FIG. 4 is a sectional view showing the recording head. In FIG. 3, of the elements constituting the recording head 2, a pressure chamber substrate 10 and a filter member 40 are shown, and a protective substrate 30 and a case member 100 are not shown. FIG. 4 is a view corresponding to line IV-IV in FIG. 3.

As shown in the drawings, the recording head 2 according to the present embodiment includes the pressure chamber substrate 10. The pressure chamber substrate 10 is formed of, for example, a silicon substrate, a glass substrate, a silicon-on-insulator (SOI) substrate, various ceramic substrates, or the like.

The pressure chamber substrate 10 has pressure chambers 12 which are recesses open on the Z2 direction side and which are arranged side by side in the X direction. The plurality of pressure chambers 12 are arranged in straight lines extending in the X direction so as to be located at the same position in the Y direction. The pressure chambers 12 adjacent to each other in the X direction are defined by partition walls (not shown). In the present embodiment, the pressure chambers 12 are arranged side by side in rows in the X direction. The plurality of pressure chambers 12 arranged in rows in this way are provided in two rows in the Y direction. The plurality of pressure chambers 12 in each row are arranged so as to be located at the same position in the Y direction. Note that the arrangement of the pressure chambers 12 is not particularly limited. For example, the arrangement of the plurality of pressure chambers 12 arranged side by side in the X direction may be a so-called zigzag arrangement in which the pressure chambers 12 are staggered in the Y-axis direction.

The pressure chamber 12 is formed in a rectangular shape which is longer in the Y direction than in the X direction in plan view as viewed in the Z direction. It should be understood that the shape of the pressure chamber 12 is not particularly limited and may be a parallelogram shape, a polygonal shape, a circular shape, an oval shape, or the like. Note that an oval shape herein is a shape, based on a rectangular shape, which is semicircular at both ends in a longitudinal direction, and includes a rectangular shape with rounded corners, an elliptical shape, an egg shape, and the like.

On the Z2 direction side of the pressure chamber substrate 10, a communication plate 15, a nozzle plate 20, and a compliant substrate 110 are sequentially stacked together.

The communication plate 15 is provided with nozzle communication paths 16 through which the pressure chambers 12 and the nozzles 21 communicate with each other. The communication plate 15 is also provided with first manifold portions 17 and second manifold portions 18 each forming a portion of a manifold 130 which is a common liquid chamber with which the plurality of pressure chambers 12 communicate. The first manifold portions 17 are provided to extend through the communication plate 15 in the Z direction. The second manifold portions 18 are provided not to extend through the communication plate 15 in the Z direction and to be open in the surface thereof on the Z2 direction side. In addition, the first manifold portions 17 and the second manifold portions 18 form the manifolds 130. The manifolds 130 are continuously provided in the X direction, and supply communication paths 19 that allow the manifolds 130 to communicate with the pressure chambers 12 are arranged side by side in the X direction.

The communication plate 15 is provided with the supply communication paths 19 independently for the respective pressure chambers 12, each supply communication path 19 communicating with one end of the pressure chamber 12 in the Y direction. The supply communication paths 19 allow the second manifold portions 18 to communicate with the pressure chambers 12 and supply the ink in the manifolds 130 to the pressure chambers 12.

As the communication plate 15, a silicon substrate, a glass substrate, an SOI substrate, various ceramic substrates, a metal substrate, or the like can be used.

The nozzle plate 20 is provided on the surface of the communication plate 15 on the Z2 direction side, which is the opposite side from the pressure chamber substrate 10. In the nozzle plate 20, the nozzles 21 communicating with the pressure chambers 12 via the nozzle communication paths 16 are formed.

The plurality of nozzles 21 are provided for the individual pressure chambers 12 and are arranged in rows in the X direction. The plurality of nozzles 21 arranged in rows in this way are provided in two rows in the Y direction. The plurality of nozzles 21 in each row are arranged so as to be located at the same position in the Y direction. Note that the arrangement of the nozzles 21 is not particularly limited. For example, the nozzles 21 arranged side by side in the X direction may be staggered in the Y direction.

The material of the nozzle plate 20 is not particularly limited, and for example, a silicon substrate, a glass substrate, an SOI substrate, various ceramic substrates, and a metal substrate can be used. Examples of the metal substrate include stainless steel substrates and the like. As the material of the nozzle plate 20, an organic substance, such as a polyimide resin, can also be used.

The compliant substrate 110 is provided together with the nozzle plate 20 on the surface of the communication plate 15 on the Z2 direction side, which is the opposite side from the pressure chamber substrate 10. The compliant substrate 110 is provided around the nozzle plate 20 and seals openings of the first manifold portions 17 and the second manifold portions 18 provided in the communication plate 15. In the present embodiment, the compliant substrate 110 includes a sealing film 111 formed of a flexible thin film and a fixing substrate 112 formed of a hard material such as metal. Regions of the fixing substrate 112 which face the manifolds 130 are removed portions 118 completely removed in a thickness direction. Therefore, one side of each manifold 130 is sealed only by the flexible sealing film 111, thereby forming a compliant portion 119.

A diaphragm 84 and piezoelectric actuators 80 are provided on a surface of the pressure chamber substrate 10 on the Z1 direction side. That is, the pressure chamber substrate 10, the diaphragm 84, and the piezoelectric actuators 80 are stacked together in this order from the Z2 direction side to the Z1 direction side.

The diaphragm 84 includes an elastic film provided on the surface of the pressure chamber substrate 10 on the Z1 direction side, and an insulator film provided on a surface of the elastic film on the Z1 direction side. The elastic film is a film formed of, for example, silicon oxide ($SiO_2$). For example, when a silicon substrate is used as the pressure chamber substrate 10, the elastic film can be formed by thermal oxidation of the surface of the pressure chamber substrate 10 on the Z1 direction side. The insulator film is a film formed of, for example, zirconium oxide ($ZrO_2$). For example, the insulator film can be formed by forming a layer of elemental zirconium by a sputtering method or the like and then thermally oxidizing the layer. Note that the diaphragm is not particularly limited to one including an elastic film and an insulator film. For example, any one of the elastic film and the insulator film may be provided as the diaphragm 84. In addition, first electrodes 81 of the piezoelectric actuators 80, which will be described later, may be used as the diaphragm without providing the elastic film and the insulator film.

On the surface of the diaphragm 84 on the Z1 direction side, the piezoelectric actuators 80 are provided, which include a first electrode 81, a piezoelectric layer 82, and a second electrode 83. The piezoelectric actuators 80 are also referred to as piezoelectric elements and are portions including the first electrode 81, the piezoelectric layer 82, and the second electrode 83. In addition, the piezoelectric actuators 80 are driving elements that cause pressure changes in the ink in the pressure chambers 12. Further, a portion in which piezoelectric distortion occurs in the piezoelectric layer 82 when a voltage is applied between the first electrode 81 and the second electrode 83 is referred to as an active portion. That is, the active portion is a portion in which the piezoelectric layer 82 is interposed between the first electrode 81 and the second electrode 83. In the present embodiment, the active portion is formed for each pressure chamber 12. The plurality of active portions function as "driving elements" that cause pressure changes in the ink in the pressure chambers 12. Accordingly, generally, any one electrode of the active portion is configured as an individual electrode independent for each active portion, and the other electrode is configured as a common electrode common to a plurality of active portions. In the present embodiment, the first electrode 81 is provided separately for each active portion to form an individual electrode of the active portion, and the second electrode 83 is provided continuously across a plurality of active portions to form a common electrode common to the plurality of active portions. It should be understood that the first electrode 81 may form a common electrode, and the second electrode 83 may form an individual electrode.

The piezoelectric layer 82 is formed using a piezoelectric material formed of a composite oxide with a perovskite structure represented by the general formula $ABO_3$.

An individual lead electrode 91 is routed from each first electrode 81, and a common lead electrode 92 is routed from each second electrode 83. A flexible wiring substrate 120 is coupled to the individual lead electrodes 91 and the common lead electrodes 92 at the end portions on the opposite side from the piezoelectric actuators 80. In the present embodiment, the individual lead electrodes 91 and the common lead electrodes 92 extend so as to be exposed in a first wiring insertion hole 32 formed in the protective substrate 30 and are electrically coupled to the wiring substrate 120 in the first wiring insertion hole 32. A driving circuit 121 having switching elements for driving the piezoelectric actuators 80 is mounted on the wiring substrate 120.

In the above-described piezoelectric actuator 80, the first electrode 81 is configured as an individual electrode for each piezoelectric actuator 80, and the second electrode 83 is configured as a common electrode common to each piezoelectric actuator 80. However, the configuration is not limited thereto. That is, the first electrode 81 may be configured as a common electrode common to each piezoelectric actuator 80, and the second electrode 83 may be configured as an individual electrode for each piezoelectric actuator 80.

The protective substrate 30 having substantially the same size as the pressure chamber substrate 10 is joined to the surface of the pressure chamber substrate 10 on the Z1 direction side. The protective substrate 30 has holding portions 31 that are spaces for protecting the piezoelectric actuator 80. The holding portions 31 are provided independently for the individual rows of the piezoelectric actuators 80 arranged side by side in the X direction, and thus two holding portions 31 are formed side by side in the Y direction. In addition, the protective substrate 30 is provided with a first wiring insertion hole 32 extending through the protective substrate 30 in the Z direction between the two holding portions 31 arranged side by side in the Y direction.

The filter member 40 is joined to the surface of the communication plate 15 on the Z1 direction side, and the case member 100 is joined to the surface of the filter member 40 on the Z1 direction side.

Here, the communication plate 15 and the case member 100 are each an example of a first flow path member, and the filter member 40 is an example of a second flow path member. In FIGS. 2 and 3, regions R in which filter holes 50 are provided in the surface of the filter member 40 on the Z1 direction side are shown only by hatching, and the individual filter holes 50 are not shown.

The case member 100 has a housing portion 101 which is a space deep enough to house the pressure chamber substrate 10 and the protective substrate 30. The housing portion 101 has an opening area larger than the surface of the protective substrate 30 that is joined to the pressure chamber substrate 10. In addition, in a state in which the pressure chamber substrate 10 and the protective substrate 30 are housed in the housing portion 101, the opening surface of the housing portion 101 on the pressure chamber substrate 10 side is sealed by the diaphragm 84. Further, the case member 100 is provided with a second wiring insertion hole 103 which communicates with the first wiring insertion hole 32 of the protective substrate 30 and through which the wiring substrate 120 is inserted.

In the case member 100, ink introduction portions 102 are defined on both outer sides of the housing portion 101 in the Y direction. The case member 100 is provided with inlets 104 which communicate with the ink introduction portions 102 to supply the ink to the ink introduction portions 102.

Here, the ink introduction portions 102 and the manifolds 130 formed in the above-described communication plate 15 form reservoirs 140.

Although the material of the case member 100 is not particularly limited, in the present embodiment, the case member 100 is formed of a thermosetting resin. The thermosetting resin is not particularly limited, and examples thereof include a phenol resin, a urea resin, a melamine resin, an epoxy resin, an alkyd resin, an unsaturated polyester resin, and a diallyl phthalate resin. These may be used alone or in combination of two or more thereof in the form of a copolymer or a blend. The thermosetting resin may include one or both of an inorganic filler and an inorganic fiber base material.

The filter member 40 is a member which allows the passage of ink and captures a foreign substance heading to the nozzles 21. In the example shown in FIGS. 2 and 3, the filter member 40 is disposed so as to divide the reservoirs 140 into the manifolds 130 and the ink introduction portions 102. That is, the filter member 40 is interposed between the communication plate 15 and the case member 100 and is bonded to the communication plate 15 and the case member 100.

The filter member 40 is formed of, for example, a metal such as nickel or palladium and is preferably manufactured by an electroforming method.

The method for manufacturing the filter member 40 is not limited to the electroforming method, and for example, a method using dry etching, wet etching, or the like may be used.

In addition, the filter member 40 does not need to be composed of one layer and may be composed of a stack of layers. However, at least one layer is formed of a metal. In addition, two filter members 40 may be coupled to each other to form a frame shape.

Although details will be described later, by bonding the filter members 40 formed of a metal with the adhesive used in the present disclosure, even when the bonding interface comes into contact with the liquid in the flow path, the elution of metal ions into the liquid is reduced, and thereby interfacial peeling or the like is suppressed.

There is a possibility that the elution of metal ions may also occur for metals other than nickel and palladium, but the same advantage can be exhibited even for metals other than nickel and palladium, for example, copper and alloys containing copper. However, an electroformed filter including at least one of nickel or palladium is particularly preferable. In the present embodiment, the filter member 40 is an electroformed filter formed of Ni—Pd.

In the present embodiment, in plan view as viewed in the Z2 direction, the outer shape of the filter member 40 is substantially the same as the outer shape of the communication plate 15. In addition, the filter member 40 has an opening portion 45 in which a region facing the pressure chamber substrate 10 is removed in the Z direction. The filter member 40 is provided on the surface of the communication plate 15 on the Z1 direction side in a state in which the pressure chamber substrate 10 is disposed inside the opening portion 45.

In the regions R of the filter member 40 facing the first manifold portions 17 in plan view as viewed in the Z2 direction, the filter holes 50 are provided. The detailed configurations of the filter member 40 and the filter holes 50 are not particularly limited.

The filter member 40 is provided between the communication plate 15 and the case member 100, and these members are bonded with an adhesive 60. In this manner, the communication plate 15, the filter member 40, and the case member 100 are stacked together in this order from the Z2 direction side to the Z1 direction side by using the adhesive 60, and the manifolds 130 and the ink introduction portions 102 communicate with each other via the filter holes 50 of the filter member 40. Here, the adhesive 60 represents an adhesive layer after the adhesive is cured.

Here, since a thermosetting resin has excellent mold-filling properties and forms a molded product with edges, a filler and an epoxy resin, as components of the molded product, easily come off and become foreign substances. When foreign substances are generated after filling the recording head 2 with ink and while using recording head 2, there is a possibility that the nozzles 21 may be clogged with the foreign substances, and thus it is necessary to provide a filter near the nozzles 21. Since the filter needs to be smaller than the diameter of the nozzles 21, it is necessary to use a thin film in consideration of pressure loss. Therefore, as in this embodiment, it is preferable to employ an electroformed thin film prepared by an electroforming method as the filter member 40. Particularly, in consideration of liquid resistance and corrosion resistance, it is preferable to employ an electroformed filter formed of nickel, palladium, or an alloy thereof as the filter member 40. However, since the filter member 40 is formed of a metal, there is a possibility that when the filter member 40 comes into contact with the ink, the metal ions of the filter member 40 are eluted into the ink at the bonding interface between the filter member 40 and the case member 100, which decreases the bonding strength.

Here, in the present disclosure, as an adhesive used as the adhesive 60, an adhesive containing a water-insoluble chelate compound is used.

When such an adhesive is used, the elution of metal ions from the filter member 40 is suppressed by the chelate compound, thereby suppressing interfacial peeling, such that the reliability of the bonding strength of the adhesive 60 can be improved. In addition, since the chelate compound is water-insoluble, the elution of the chelate compound into the liquid (ink) can be reduced, and the bonding stability is maintained for a long period of time.

Here, the term "water-insoluble" means that when 0.5 g of the chelate compound is dissolved in 100 g of water at 25° C., the insoluble content is 99% by mass or more.

In addition, the chelate compound is a compound having a benzotriazole skeleton and is preferably an oil-soluble benzotriazole. Examples of the oil-soluble benzotriazole include 1-[N,N-bis(2-ethylhexyl)aminomethyl]benzotriazole, 1-[N,N-bis(2-ethylhexyl)aminomethyl]methylbenzotriazole, 5-carboxybenzotriazole, and tolyltriazole, and 5-carboxybenzotriazole is particularly preferable.

Here, the term "oil-soluble" denotes a compound having oleophilic properties (affinity for organic solvents) as a whole, and a benzotriazole having many hydrophilic substituents is not preferable. An oil-soluble benzotriazole is a compound which is not dissolved in an amount of 0.5 g or more in 100 g of pure water at 20° C.

The adhesive used in the present disclosure is not particularly limited as long as the adhesive has adhesion to the communication plate 15 and the case member 100, each of which is a first flow path member, and also has adhesion to the filter member 40, which is a second flow path member, except that the adhesive contains a chelate compound as described above. For example, an epoxy-based adhesive may be used. Particularly, an epoxy-based adhesive containing a multifunctional epoxy resin having two or more epoxy groups as a main agent and at least one of a curing accelerator or a curing agent is preferable. Note that the adhesive may include an inorganic powder such as silica powder or alumina powder.

Examples of the curing agent include aliphatic polyamines, polyaminoamides, polymercaptans, acid anhydrides, phenol novolak resin, and dicyandiamide. Examples of the curing accelerator include DBU, DBN, tris(dimethylaminomethyl)phenol, 1-cyanoethyl-2-ethyl-4-methylimidazole, 2-ethyl-4-methylimidazole, 3-phenyl-1,1-dimethylurea, and sulfonium salts. A compound having in the molecule one or more active hydrogens capable of an addition reaction with an epoxy group may be used. Examples of the curing accelerator include aliphatic amine compounds such as diethylenetriamine, triethylenetetramine, n-propylamine, 2-hydroxyethylaminopropylamine, cyclohexylamine, and 4,4'-diamino-dicyclohexylmethane; aromatic amine compounds such as 4,4'-diaminodiphenylmethane and 2-methylaniline; imidazole compounds such as imidazole, 2-methylimidazole, 2-ethylimidazole, and 2-isopropylimidazole; and imidazoline compounds such as imidazoline, 2-methylimidazoline, and 2-ethylimidazoline. From the viewpoint of being liquid and having storage stability, aromatic amine compounds are preferable.

The adhesive of the present disclosure is a mixture of a base adhesive component, for example, a mixture of the individual components of a one-component epoxy-based adhesive, with a chelate compound. The chelate compound is as described above, but when the chelate compound is an oil-soluble benzotriazole which is a solid before curing, in other words, an oil-soluble benzotriazole which becomes a complex film after curing, it is preferable to dissolve the chelate compound in an appropriate organic solvent and mix the resultant solution with the adhesive component. Here, as the organic solvent, diethylene glycol diethyl ether, diethylene glycol dibutyl ether, and the like can be used.

Further, when the chelate compound is mixed with a two-component epoxy-based adhesive, it is preferable that the chelate compound be mixed in advance with the epoxy-based resin as a main agent or an auxiliary agent that is any one of a curing accelerator and a curing agent, and it is more preferable that the chelate compound be mixed with the main agent.

Here, the content of the chelate compound in the adhesive used in the present disclosure is preferably 0.56% by mass or more. This is because the elution of metal ions from the filter member 40 is suppressed by the chelate compound, thereby suppressing interfacial peeling, such that the advantage that the reliability of the bonding strength of the adhesive can be improved can be effectively exhibited.

In addition, the content of the chelate compound in the adhesive is preferably 3.51% by mass or less. When the case member 100, which is a first flow path member, is formed of a thermosetting resin and the amount of the chelate compound is increased more than necessary, there is a tendency that the adhesion to the case member 100 decreases.

Therefore, the content of the chelate compound in the adhesive is preferably 0.56% by mass or more and 3.51% by mass or less. This is because the elution of metal ions from the filter member 40 is suppressed by the chelate compound, thereby suppressing interfacial peeling, such that the advantage that the reliability of the bonding strength of the adhesive can be improved can be effectively exhibited, and thus even when the first flow path member is formed of a thermosetting resin, the adhesion to the first flow path member is not decreased.

Here, the content of the chelate compound in the adhesive is a proportion with respect to the mass of the adhesive after curing. That is, for example, 1-[N,N-bis(2-ethylhexyl)aminomethyl]benzotriazole or 1-[N,N-bis(2-ethylhexyl)aminomethyl]methylbenzotriazole as the chelate compound included in the adhesive is liquid but becomes a complex film (solid) after curing. Therefore, the content of the chelate compound in the adhesive is a proportion of the complex film with respect to the mass of the adhesive after curing.

In the recording head 2 of the present embodiment, ink is supplied to the ink introduction portions 102 from the inlets 104, which are coupled to an external ink supply unit (not shown). Foreign substances are removed from the ink in the ink introduction portions 102 by the filter member 40 and the ink is supplied to the manifolds 130. Then, the inside from the manifolds 130 to the nozzles 21 is filled with the ink, and a voltage is then applied to the piezoelectric actuators 80 corresponding to the pressure chambers 12 according to recording signals from the driving circuit 121. As a result, the diaphragm 84 is flexurally deformed together with the piezoelectric actuators 80 to increase the pressure in the pressure chambers 12, and ink droplets are ejected from the nozzles 21.

In the present embodiment, as the ink, for example, a UV ink or a solvent-based ink is preferably used. However, since a UV ink or a solvent-based ink having hygroscopicity contains 1% to 2% of water, electricity easily flows between the filter member 40 and the ink when the ink is supplied to the flow path of the recording head 2. Therefore, metal ions are easily eluted from the filter member 40 into the water in the ink. However, in the present disclosure, since an adhesive containing a chelate compound is used as the adhesive 60, the chelate compound, which forms a complex with metal ions, is present at the bonding interface of the filter member 40. Thus, the elution of metal ions from the filter member 40 into the water in the ink is reduced, and a decrease in bonding strength can be suppressed.

Hereinafter, the present disclosure will be described in more detail based on examples.

FIG. 5 is a table showing the individual components of chelate compound mixtures 1 to 4 and chelate compounds 5 and 6 and the test results. FIG. 6 is a table showing the individual components of adhesive samples 1 to 10 and the test results. FIG. 7 is a table showing the individual components of adhesive samples 11 to 20 and the test results. FIG. 8 is a table showing the individual components of adhesive samples 21 to 30 and the test results. FIG. 9 is a table showing the individual components of adhesive samples 31 to 40 and the test results. FIG. 10 is a table showing the individual components of adhesive samples 41 to 44 and the test results.

Chelate Compound Mixtures 1 to 4 and Chelate Compounds 5 and 6

The chelate compounds and dispersants shown in the table in FIG. 5 were mixed in the blending ratios shown in the table in FIG. 5 to produce chelate compound mixtures 1 to 4. In the chelate compound mixtures 1 to 4, as an oil-soluble chelate compound, 5-carboxybenzotriazole was used.

Since 5-carboxybenzotriazole was a solid powder, as an organic solvent used as a dispersant, diethylene glycol diethyl ether or diethylene glycol dibutyl ether was blended, and the mixtures were stirred with a stirrer for 1 hour to produce chelate compound mixtures 1 to 4.

Since 1-[N,N-bis(2-ethylhexyl)aminomethyl]benzotriazole and 1-[N,N-bis(2-ethylhexyl)aminomethyl]methylbenzotriazole, which are chelate compounds 5 and 6 shown in the table in FIG. 5, were liquid, an organic solvent was not particularly used. Chelate compounds 5 and 6 may be made into chelate compound mixtures by stirring with the organic solvent as the dispersant described above.

Here, for each of chelate compound mixtures 1 to 4, the presence of aggregates and the presence of supernatant after 28 days were observed. For the former determination, when aggregates were observed using a grind gauge, a case in which a streak of aggregates with a size of 20 μm or more was not observed was evaluated as A, and a case in which a streak of aggregates with a size of 20 μm or more was observed but a streak of aggregates with a size of 50 μm or more was not observed was evaluated as B. A case in which no supernatant was observed after 28 days was evaluated as A, and a case in which a supernatant was observed after 28 days was evaluated as B.

Since chelate compounds 5 and 6 are liquid, no aggregates or supernatant is formed. Therefore, for chelate compounds 5 and 6, the above-described observation was not performed, and in the table in FIG. 5, no evaluation (–) is shown.

As shown in the table in FIG. 5, since a supernatant was observed in chelate compound mixtures 1 and 2 after 28 days, it was found that, when the dispersant was diethylene glycol diethyl ether, the chelate compound and the dispersant were easily separated. Therefore, it is preferable that chelate compound mixtures 1 and 2 be mixed with an adhesive immediately after kneading. In addition, since the amount of the dispersant in chelate compound mixture 2 was large compared with chelate compound mixture 1, a mass of aggregates was not easily formed.

As shown in the table in FIG. 5, a supernatant was not observed in chelate compound mixtures 3 and 4 after 28 days, and a mass of aggregates was not easily formed. Therefore, it is preferable to use diethylene glycol dibutyl ether as the dispersant.

Adhesive Samples 1 to 10

Chelate compound mixture 1 was mixed with epoxy-based adhesives having the compositions shown in the table in FIG. 6 in the blending ratios shown in the table in FIG. 6 to prepare adhesive samples 1 to 10.

As the epoxy-based adhesives, mixtures of the following components were used.

Component P: triglycidyl-p-aminophenol

Component Q: bisphenol F type epoxy resin (epoxy equivalent: 160)

Component S: 2-ethyl-4-methylimidazole

Component S may have in the molecule one or more active hydrogens capable of an addition reaction with an epoxy group. Examples of component S include aliphatic amine compounds such as diethylenetriamine, triethylenetetramine, n-propylamine, 2-hydroxyethylaminopropylamine, cyclohexylamine, 4,4'-diamino-dicyclohexylmethane, and m-xylenediamine; aromatic amine compounds such as 4,4'-diaminodiphenylmethane and 2-methylaniline; imidazole compounds such as imidazole, 2-methylimidazole, 2-ethylimidazole, 2-isopropylimidazole, 2-ethyl-4-methylimidazole, and 1-benzyl-2-phenylimidazole; and imidazoline compounds such as imidazoline, 2-methylimidazoline, and 2-ethylimidazoline.

Adhesion Test: Shape of Transfer Film

First, each of adhesive samples 1 to 10 was applied to Lumirror (registered trademark), which is an A4-size PET film having a thickness of 100 μm, by using a bar coater with a coating film width of approximately 70 mm and a wet film thickness of 100 μm. The Lumirror was folded into a curved shape such that the surface of the Lumirror to which the adhesive sample was applied was located on the outer side and such that the short sides of the Lumirror overlapped each other. The surface of the folded Lumirror to which the adhesive sample was applied was pressed perpendicularly against a surface of a rectangular object (with a width of 100 mm, a depth of 100 mm, and a thickness of 2 mm) formed by curing an epoxy resin to transfer the adhesive sample thereto. Then, the shape of the transfer film of the adhesive sample formed on the surface of the epoxy resin object was observed, and whether unevenness was observed on the surface of the adhesive on the rectangular object formed by curing the epoxy resin was evaluated as follows.

In addition, each adhesive sample was placed into a syringe in advance and was applied to the surface of a Ni—Pd electroformed sheet (with a width of 20 mm, a depth of 20 mm, and a thickness of 10 μm) to form a coating with a diameter of about 2 mm and a height of 1 mm. Next, the Lumirror (registered trademark), which is an A4-size PET film having a thickness of 100 μm, was folded into a curved shape such that the short sides thereof overlapped each other and was pressed against the coating, and whether a sink mark was observed at the boundary line between the adhesive and the Ni—Pd electroformed sheet was evaluated as follows.

A: Unevenness was not observed on the surface of the adhesive on the rectangular object formed by curing the epoxy resin. Further, a sink mark was not observed at the boundary line between the adhesive and the Ni—Pd electroformed sheet.

B: Unevenness was not observed on the surface of the adhesive on the rectangular object formed by curing the epoxy resin. However, a sink mark was observed at the boundary line between the adhesive and the Ni—Pd electroformed sheet.

Adhesion Test: Bonding Strength

In addition, the bonding strength after bonding and the bonding strength after immersion in an evaluation solution at 60° C. for 8 weeks were measured.

For the bonding strength, each of adhesive samples 1 to 10 was interposed between a Ni—Pd electroformed sheet and 200 μm thick shim rings and molded articles of a thermosetting resin and was cured at 100° C. for 8 hours to prepare a tensile strength test piece.

Here, the tensile strength test piece will be described in detail. To prepare one test piece, two cubes of 300 mm on each side as an epoxy resin cured product (hereinafter, one of the two cubes is referred to as a first epoxy molded article, and the other is referred to as a second epoxy molded article), two stainless steel shim rings having a thickness of 100 μm (hereinafter, one of the two stainless steel shim rings is referred to as a first shim ring, and the other is referred to as a second shim ring), and a Ni—Pd electroformed sheet having a thickness of 10 μm were prepared. The first shim ring was mounted on the first epoxy molded article. Then, the adhesive sample was applied to the inner side of the first shim ring on the same surface as the surface of the first epoxy molded article on which the first shim ring was mounted so as not to come into contact with the first shim ring. Then, the electroformed sheet was mounted on the surface of the first shim ring on the opposite side from the first epoxy molded article, and thus the surface of the electroformed sheet mounted on the first shim ring was bonded to the first epoxy molded article by the adhesive sample applied to the first epoxy molded article. Next, the second shim ring was mounted on the surface of the electroformed sheet on the opposite side from the first shim ring. Then, the adhesive sample was applied to the inner side of the second shim ring on the same surface as the surface of the electroformed sheet on which the second shim ring was mounted so as not to come into contact with the second shim ring. Then, the second epoxy molded article was mounted on the surface of the second shim ring on the opposite side from the electroformed sheet, and thus the surface of the second epoxy molded article mounted on the second shim ring was bonded to the electroformed sheet by the adhesive sample applied to the surface of the electroformed sheet on the opposite side from the first epoxy molded article. Thereafter, the test piece assembled by stacking the epoxy molded articles, the shim rings, and the electroformed sheet as described above were heated at a curing temperature of 100° C. for 8 hours to cure the adhesive sample and thereby prepare a test piece.

Destructive inspection of the adhesive regarding tension was performed by setting the test piece thus obtained in a tensile tester, holding the first epoxy molded article and the second epoxy molded article, and pulling the first epoxy molded article and the second epoxy molded article in a direction in which the molded articles were separated from each other. This inspection was conducted in accordance with JIS K 6849. Then, the bonding strength, expressed in MPa, was determined from the maximum load (N) at which the adhesive of the adhesive sample was destroyed (interfacial peeling) and the area of the adhesive sample remaining on the epoxy molded article after the bonding destruction as measured using a digital microscope.

Then, the tensile strength test piece was subjected to measurement with a tensile tester before and after immersion in the evaluation solution and evaluated as follows. In the immersion of the tensile strength test piece in the evaluation solution, a UV monomer evaluation solution in which a UV ink excessively absorbed moisture at a ratio of N-vinyl-ε-caprolactam (CAS 2235-00-9):tetrahydrofurfuryl acrylate (CAS 2399-48-6):water=48:48:4 was used. After the test piece was immersed and left to stand, the test piece was removed, washed with ethanol, and then subjected to tensile evaluation based on the tensile bonding strength test method (JIS K 6849).

A: The initial bonding strength was 30 MPa or more and the bonding strength after being immersed and left to stand was 10 MPa or more.

B: The initial bonding strength was 20 MPa or more and the bonding strength after being immersed and left to stand was 10 MPa or more.

C: The initial bonding strength was less than 20 MPa or the bonding strength after being immersed and left to stand was less than 10 MPa.

The above results are shown in the table in FIG. 6.

The table in FIG. 6 also shows the masses of the chelate compounds included in the adhesives after curing and the mass percentages, rounded to the second decimal place, of the chelate compounds to the adhesives after curing.

Result 1

For adhesive samples 1 to 10, the shape of the transfer film was rated as B, and there was no particular problem. However, since a sink mark was observed at the boundary line between the adhesive and the Ni—Pd electroformed sheet, the wettability of the adhesive before curing was poor and the adhesive was not easily spread.

In addition, for adhesive samples 1 to 8, the bonding strength was rated as B and was within a range in which there was no problem. However, for adhesive sample 9, in which the content of the chelate compound was as small as 0.3% by mass, and adhesive sample 10, in which the content of the chelate compound was as large as 5.71% by mass, the bonding strength was low.

Adhesive Samples 11 to 20

Chelate compound mixture 2 was mixed with epoxy-based adhesives having the compositions shown in the table in FIG. 7 in the blending ratios shown in the table in FIG. 7 to prepare adhesive samples 11 to 20.

An adhesion test was performed in the same manner as described above, and the results are shown in the table in FIG. 7.

Result 2

For adhesive samples 11 to 20, the shape of the transfer film was rated as A, and there was no problem at all. In comparison with Result 1, it was found that using more organic solvent as a dispersant resulted in smaller streaks of aggregates, and the transfer film had a good shape.

In addition, for adhesive samples 11 to 18, the bonding strength was rated as A and was within a range in which there was no problem at all. However, for adhesive sample 19, in which the content of the chelate compound was as small as 0.23% by mass, and adhesive sample 20, in which the content of the chelate compound was as large as 4.35% by mass, the bonding strength was low. That is, the bonding strength depends on the shape of the transfer film. In addition, the bonding strength depends on the content of the chelate compound included in the adhesive after curing.

Adhesive Samples 21 to 30

Chelate compound mixture 3 was mixed with epoxy-based adhesives having the compositions shown in the table in FIG. 8 in the blending ratios shown in the table in FIG. 8 to prepare adhesive samples 21 to 30.

An adhesion test was performed in the same manner as described above, and the results are shown in the table in FIG. 8.

Result 3

For adhesive samples 21 to 30, the shape of the transfer film was rated as A, and there was no problem at all.

In addition, for adhesive samples 21 to 28, the bonding strength was rated as A and was within a range in which there was no problem. However, for adhesive sample 29, in which the content of the chelate compound was as small as 0.26% by mass, and adhesive sample 30, in which the content of the chelate compound was as large as 4.94% by mass, the bonding strength was low.

Adhesive Samples 31 to 40

Chelate compound mixture 4 was mixed with epoxy-based adhesives having the compositions shown in the table in FIG. 9 in the blending ratios shown in the table in FIG. 9 to prepare adhesive samples 31 to 40.

An adhesion test was performed in the same manner as described above, and the results are shown in the table in FIG. 9.

Result 4

For adhesive samples 31 to 40, the shape of the transfer film was rated as A, and there was no problem at all.

In addition, for adhesive samples 31 to 38, the bonding strength was rated as A and was within a range in which there was no problem at all. However, for adhesive sample 39, in which the content of the chelate compound was as small as 0.26% by mass, and adhesive sample 40, in which the content of the chelate compound was as large as 4.94% by mass, the bonding strength was low.

Adhesive Samples 41 to 44

Chelate compound 5 or 6 was mixed epoxy-based adhesives having the compositions shown in the table in FIG. 10 in the blending ratios shown in the table in FIG. 10 to prepare adhesive samples 41 to 44.

An adhesion test was performed in the same manner as described above, and the results are shown in the table in FIG. 10.

Result 5

For adhesive samples 41 to 44, in which chelate compound 5 or 6 was used, both the shape of the transfer film and the bonding strength were rated as B and were feasible.

OTHER EMBODIMENTS

Although an ink jet recording head has been described as an example of a liquid ejecting head in the above-described embodiment, the present disclosure is directed to liquid ejecting heads in general. The present disclosure can also be applied to a liquid ejecting head that discharges a liquid other than ink. Examples of other liquid ejecting heads include various recording heads used in image recording apparatuses such as printers, colorant ejecting heads used in manufacturing color filters of liquid display devices or the like, electrode material ejecting heads used in forming electrodes of organic EL display devices, field emission display (FED) devices, and the like, and bioorganic substance ejecting heads used in manufacturing biochips, and the present disclosure can also be applied to liquid ejecting apparatuses including such liquid ejecting heads.

Although piezoelectric actuators have been described as driving elements that cause pressure changes in pressure chambers in the above-described embodiment, the present disclosure is not particularly limited thereto. Examples of driving elements that can be used include actuators that have heating elements disposed in pressure chambers and that discharge ink droplets from nozzles by using bubbles formed by heat from the heating elements, and so-called electrostatic actuators that discharge ink droplets from nozzles by generating static electricity between a diaphragm and an electrode and deforming the diaphragm with the static electricity.

In the above-described embodiment, the filter member 40, which is a second flow path member, is bonded between the communication plate 15 and the case member 100, each of which is a first flow path member, with the adhesive 60. The elution of metal ions from the filter member 40 into the liquid is suppressed by the chelate compound included in the adhesive, and the advantage that a decrease in bonding strength at the interface is suppressed is exhibited. However, the second flow path member does not have to be the filter member 40 as long as a similar combination is used. For example, the second flow path member may be the diaphragm 84 or may function as both the filter and the diaphragm. Further, since the second flow path member may be a member from which metal ions can be eluted, the second flow path member may be a flow path member formed of a metal such as stainless steel.

In addition, in the above-described embodiment, as the first flow path member to be bonded to the second flow path member such as an electroformed filter with the adhesive, for example, the communication plate 15 formed of silicon and the case member 100 formed of a thermosetting resin are used, but the present disclosure is not limited thereto. The first flow path member may be a flow path member formed of a metal such as stainless steel, a ceramic, or a thermoplastic resin.

In the above-described embodiment, as the ink, for example, a UV ink or a solvent-based ink is preferable, but the present disclosure is not limited thereto. For example, an aqueous ink may be used.

It should be understood that the present disclosure is not limited to the embodiments described above. It will be obvious to those skilled in the art that the following are disclosed as embodiments of the present disclosure:

- Mutually replaceable members, configurations, and the like disclosed in the embodiments described above may be applied in different combinations as appropriate.
- Members, configurations, and the like not disclosed in the embodiments described above but known in the art and mutually replaceable with the members, configurations, and the like disclosed in the embodiments described above may be applied as appropriate, and they may also be applied in different combinations.
- Members, configurations, and the like not disclosed in the examples described above but conceivable as substitutes for the members, configurations, and the like disclosed in the embodiments described above by a person skilled in the art based on the known art may be applied as appropriate, and they may also be applied in different combinations.

APPENDIX

For example, the following configurations can be grasped from the embodiments given by way of example above.

According to Aspect 1, which is a preferred aspect, there is provided a liquid ejecting head including a nozzle that ejects a liquid, a first flow path member that defines a portion of a flow path for supplying the liquid to the nozzle, a second flow path member that is bonded to the first flow path member to define a portion of the flow path and that is formed of a metal, and an adhesive that bonds the first flow path member and the second flow path member, wherein the adhesive contains a water-insoluble chelate compound.

According to Aspect 1, since an adhesive containing a water-insoluble chelate compound is used as the adhesive, the elution of metal ions from the second flow path member is suppressed by the chelate compound, thereby suppressing interfacial peeling, such that the reliability of the bonding strength of the adhesive can be improved. Further, since the chelate compound is water-insoluble, the elution of the chelate compound into the liquid can be reduced, and the bonding stability is maintained for a long period of time.

In addition, in Aspect 2, which is a specific example of Aspect 1, the chelate compound is an oil-soluble benzotriazole. According to Aspect 2, since the chelate compound is an oil-soluble benzotriazole, the elution of the chelate compound into the liquid can be more reliably reduced, and the bonding stability is maintained for a long period of time.

In addition, in Aspect 3, which is a specific example of Aspect 2, the chelate compound is 5-carboxybenzotriazole. According to Aspect 3, since the chelate compound is 5-carboxybenzotriazole, the elution of the chelate compound into the liquid can be more reliably reduced, and the bonding stability is maintained for a long period of time.

In addition, in Aspect 4, which is a specific example of Aspect 1, the adhesive contains a multifunctional epoxy resin having two or more epoxy groups as a main agent and at least one of a curing accelerator or a curing agent. According to Aspect 4, since an epoxy-based adhesive is used, the reliability of the bonding strength can be ensured, the elution of the chelate compound into the liquid can be more reliably reduced, and the bonding stability is maintained for a long period of time.

In addition, in Aspect 5, which is a specific example of Aspect 1, a content of the chelate compound with respect to the adhesive is 0.56% by mass or more. According to Aspect 5, the elution of metal ions from the second flow path member is more reliably reduced by the chelate compound, thereby suppressing interfacial peeling, such that the advantage that the reliability of the bonding strength of the adhesive can be improved can be effectively exhibited.

In addition, in Aspect 6, which is a specific example of Aspect 1, a content of the chelate compound with respect to the adhesive is 3.51% by mass or less. According to Aspect 6, even when the first flow path member is formed of a thermosetting resin, a decrease in adhesion to the first flow path member can be reduced by the chelate compound.

In addition, in Aspect 7, which is a specific example of Aspect 1, a content of the chelate compound with respect to the adhesive is 0.56% by mass or more and 3.51% by mass or less. According to Aspect 7, the elution of metal ions from the second flow path member is suppressed by the chelate compound, thereby suppressing interfacial peeling, such that the advantage that the reliability of the bonding strength of the adhesive can be improved is exhibited. Thus, even when the first flow path member is formed of a thermosetting resin, the adhesion to the first flow path member is not decreased.

In addition, in Aspect 8, which is a specific example of Aspect 1, the second flow path member is an electroformed filter formed of a metal including at least one of nickel or palladium. According to Aspect 8, the elution of the metal ions such as nickel or palladium ions from the second flow path member is suppressed by the chelate compound, thereby suppressing interfacial peeling, such that the reliability of the bonding strength of the adhesive can be improved. Further, since the chelate compound is water-insoluble, the elution of the chelate compound into the liquid can be reduced, and the bonding stability is maintained for a long period of time.

In addition, in Aspect 9, which is a specific example of Aspect 8, the first flow path member is formed of a thermosetting resin, and the liquid is supplied to the nozzle from the flow path in the first flow path member through the electroformed filter. According to Aspect 9, the elution of metal ions from the second flow path member is suppressed by the chelate compound, thereby suppressing interfacial peeling, such that the advantage that the reliability on the bonding strength of the adhesive can be improved is exhibited. Thus, even when the first flow path member is formed of a thermosetting resin, the adhesion to the first flow path member is not decreased.

In addition, in Aspect 10, which is a specific example of Aspect 1, the liquid is an ultraviolet curable ink or a solvent-based ink. According to Aspect 10, since a UV ink or a solvent-based ink having hygroscopicity contains 1% to 2% of water, electricity easily flows between the second flow path member and the ink when the ink is supplied to the flow path of the recording head, and metal ions are easily eluted from the second flow path member into the water of the ink. However, in the present disclosure, since an adhesive containing a chelate compound is used as the adhesive, the chelate compound, which forms a complex with metal ions, is present at the bonding interface of the second flow path member. Thus, the elution of metal ions from the electroformed filter into the ink is suppressed, and a decrease in bonding strength can be suppressed.

In addition, according to Aspect 11, which is another preferred aspect, there is provided a liquid ejecting apparatus including the liquid ejecting head according to any one of Aspects 1 to 10.

According to Aspect 11, since an adhesive containing a water-insoluble chelate compound is used as the adhesive, it is possible to provide a liquid ejecting apparatus in which the reliability of the bonding strength of the adhesive can be improved by suppressing the elution of metal ions from the second flow path member by the chelate compound and thereby suppressing interfacial peeling.

What is claimed is:

1. A liquid ejecting head comprising:

a nozzle configured to eject a liquid;

a first flow path member that defines a portion of a flow path for supplying the liquid to the nozzle;

a second flow path member that is bonded to the first flow path member to define a portion of the flow path and that is formed of a metal; and an adhesive that bonds the first flow path member and the second flow path member, wherein the adhesive contains a water-insoluble chelate compound.

2. The liquid ejecting head according to claim 1, wherein the chelate compound is an oil-soluble benzotriazole.

3. The liquid ejecting head according to claim 2, wherein the chelate compound is 5-carboxybenzotriazole.

4. The liquid ejecting head according to claim 1, wherein the adhesive contains a multifunctional epoxy resin having two or more epoxy groups as a main agent, and at least one of a curing accelerator or a curing agent.

5. The liquid ejecting head according to claim 1, wherein a content of the chelate compound with respect to the adhesive is 0.56% by mass or more.

6. The liquid ejecting head according to claim 1, wherein a content of the chelate compound with respect to the adhesive is 3.51% by mass or less.

7. The liquid ejecting head according to claim 1, wherein a content of the chelate compound with respect to the adhesive is 0.56% by mass or more and 3.51% by mass or less.

8. The liquid ejecting head according to claim 1, wherein the second flow path member is an electroformed filter formed of a metal including at least one of nickel or palladium.

9. The liquid ejecting head according to claim 8, wherein
the first flow path member is formed of a thermosetting resin, and
the liquid is supplied to the nozzle from the flow path in the first flow path member through the electroformed filter.

10. The liquid ejecting head according to claim 1, wherein the liquid is an ultraviolet curable ink or a solvent-based ink.

11. A liquid ejecting apparatus comprising:
the liquid ejecting head according to claim 1; and
a liquid storage unit that stores a liquid to be supplied to the liquid ejecting head.

12. The liquid ejecting head according to claim 1, wherein
the first flow path member and the second flow path member are stacked in an ejection direction of the liquid that is ejected from the nozzle.

13. The liquid ejecting head according to claim 1, further comprising
a nozzle plate, which is different from the first flow path member and the second flow path member, and in which the nozzle is formed.

* * * * *